(12) United States Patent
Horng et al.

(10) Patent No.: US 6,538,355 B1
(45) Date of Patent: Mar. 25, 2003

(54) SUPPORTING STRUCTURE FOR A ROTOR

(75) Inventors: Alex Horng, Kaohsiung (TW); Ching-Shen Hong, Kaohsiung (TW)

(73) Assignee: Sunonwealth Electric Machine Industry Co., Kaohsiung (TW)

( * ) Notice: Subject to any disclaimer, the term of this patent is extended or adjusted under 35 U.S.C. 154(b) by 0 days.

(21) Appl. No.: 09/964,322

(22) Filed: Sep. 28, 2001

(51) Int. Cl.[7] .................................................. H02K 1/00
(52) U.S. Cl. .................... 310/91; 310/90; 310/67 R; 310/43; 310/49 R; 310/194; 384/117
(58) Field of Search ........................... 310/91, 90, 67 R, 310/90.5, 43, 49 R, 194, 42; 384/107, 114, 118, 120, 113

(56) References Cited

U.S. PATENT DOCUMENTS 4,130,770 A * 12/1978 Wrobel ........................ 310/62
5,834,870 A * 11/1998 Tokushima et al. ........... 310/90
6,340,854 B1 * 1/2002 Jeong ........................ 310/67 R

* cited by examiner

Primary Examiner—Nestor Ramirez
Assistant Examiner—Hebatallah Y. Elkassabgi
(74) Attorney, Agent, or Firm—Bacon & Thomas

(57) ABSTRACT

A supporting structure for a rotor comprises two holding members, a supporting member, and a fixing member that is fixed in place. Each holding member comprises a hole and an inner flange formed on an inner periphery defining the hole. The supporting member comprises a supporting portion and the fixing member has a hole. An end of a shaft of a rotor extends through the holes of the fixing members with an end face of the shaft resting on the supporting portion of the supporting member. A retainer is engaged in a retaining groove of the shaft to thereby retain the shaft in place. The shaft and the inner flanges of the holding members have a minimum gap or a slight contact therebetween.

17 Claims, 4 Drawing Sheets

SUPPORTING STRUCTURE FOR A ROTOR

BACKGROUND OF THE INVENTION

1. Field of the Invention

The present invention relates to a supporting structure for a rotor, wherein at least one holding member is provided for rotatably supporting the shaft of the rotor in the axle tube in a minimum deviation, such that the shaft of the rotor rotates stably and without skew since the starting moment.

2. Description of the Related Art

Applicant's copending U.S. patent application Ser. No. 09/824,725 filed on Apr. 4, 2001 and entitled SUPPORTING STRUCTURE FOR A ROTOR discloses a supporting structure comprising a metal axle tube, a holding member securely mounted in the axle tube, a supporting member securely mounted in the axle tube and having a supporting portion, and a fixing member securely mounted in the axle tube and having an opening. The holding member includes a hole and an inner flange is formed on an inner periphery defining the hole. A shaft is provided to a center of the rotor and includes an engaging groove. The shaft is extended through the hole of the holding member and the opening of the fixing member with an end face of a distal end of the shaft rotatably resting on the supporting portion of the support member and with the fixing member engaging an engaging groove of the shaft, whereby the shaft and the inner flange of the holding member have a slight contact therebetween.

Applicant's copending U.S. patent application Ser. No. 09/848,316 filed on May 4, 2001 and entitled SUPPORTING STRUCTURE FOR A ROTOR OF A MOTOR discloses a combination of a rotor and a supporting structure for the rotor. The combination comprises an axle, a fixing member securely mounted in the axle tube, a supporting member securely mounted in a lower end of the axle tube, and a rotor having a shaft base and a shaft extending from the shaft base. The shaft includes an engaging groove. The shaft is extended through the fixing member with an end face of a distal end of the shaft rotatably resting on the supporting member and with the fixing member engaging with the engaging with the engaging groove of the shaft. The shaft further includes an auxiliary supporting section, the auxiliary supporting section and inner periphery of the axle tube having a minimal gap therebetween.

However, when the shaft of the rotor rests in the axle tube, the shaft is merely supported by the flange at one point such that the central axis of the shaft might be deviated from the central axis of the axle tube. As a result, larger wobbling and larger friction occur at the starting moment of the shaft.

SUMMARY OF THE INVENTION

The primary object of the present invention is to provide a supporting structure for a rotor, wherein the shaft of the rotor and at least one holding member have a smaller contact area therebetween before rotation, thereby providing a more stable rotation at the starting moment of the shaft.

Another object of the present invention is to provide a supporting structure for a rotor, wherein the rotor rotates stably and thus has a prolonged life while the rotational noise is reduced.

A supporting structure for a rotor in accordance with the present invention comprises two holding members, a supporting member, and a fixing member that is fixed in place. Each holding member comprises a hole and an inner flange formed on an inner periphery defining the hole. The supporting member comprises a supporting portion and the fixing member has a hole. An end of a shaft of a rotor extends through the holes of the fixing members with an end face of the shaft resting on the supporting portion of the supporting member. A retainer is engaged in a retaining groove of the shaft to thereby retain the shaft in place. The shaft and the inner flanges of the holding members have a minimum gap or a slight contact therebetween.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
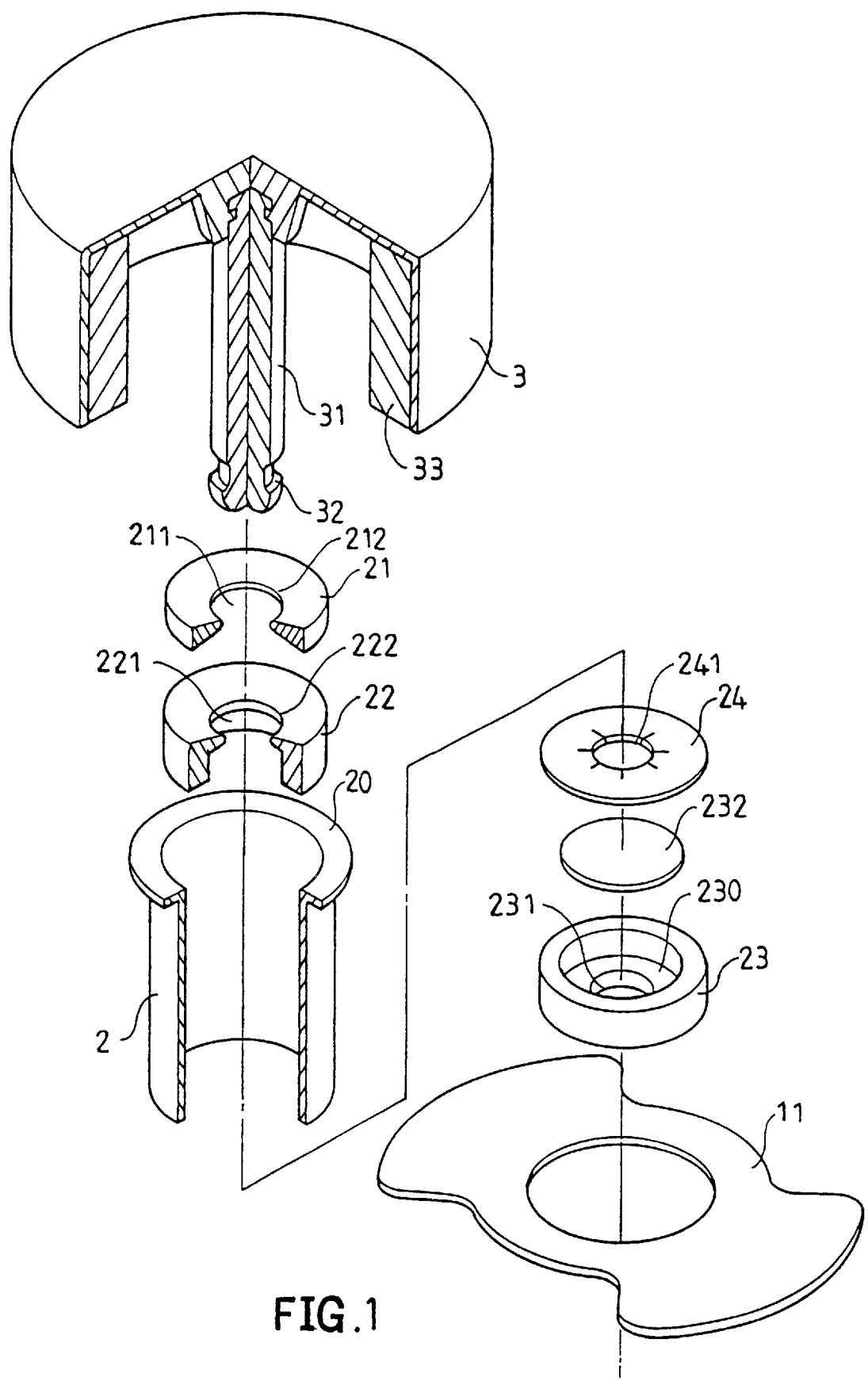
FIG. 1 is an exploded perspective view of a first embodiment of a supporting structure for a rotor in accordance with the present invention.
Figure 2:
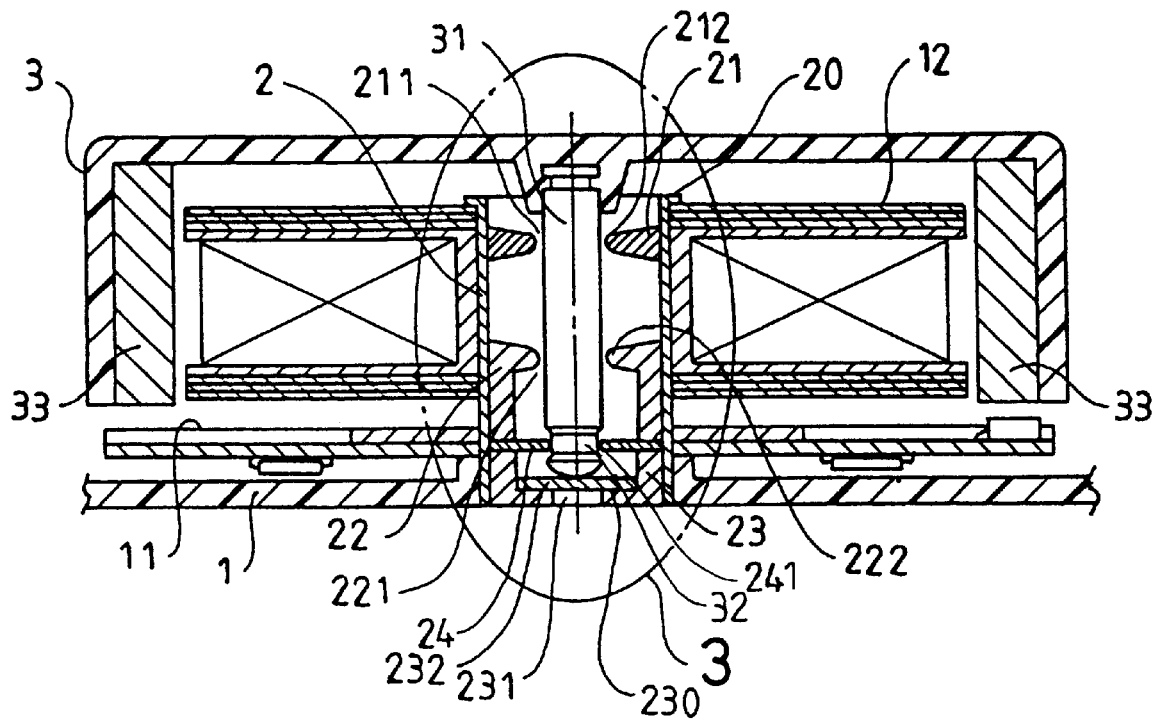
FIG. 2 is a sectional view of the supporting structure for a rotor in FIG. 1.

Referring to FIGS. 1 and 2, a first embodiment in accordance with the present invention generally comprises a base 1, a metal axle tube 2, and a rotor 3.

The base 1 may be a conventional casing for motors or heat-dissipating fans. In this preferred embodiment, the base 1 may further comprises a fixed balancing sheet 11 made of a magnetically conductive material for mutual attraction with a permanent magnet 33 of the rotor 3.

The metal axle tube 2 is made of a magnetically conductive material and has an end fixed to the base 1. A conventional stator bobbin 12 is mounted to the other end of the metal axle tube 2. In addition, the other end of the metal axle tube 2 may have a flange 20 formed thereon for preventing disengagement of the stator bobbin 12. Mounted in the metal axle tube 2 are a first holding member 21, a second holding member 22, a supporting member 23, and a fixing member 24 that can be secured to an inner periphery of the metal axle tube 2 by any fixing means. The first holding member 21 is tightly engaged with the inner periphery of the metal axle tube 2 by force-fitting. The second holding member 23 and the supporting member 23 may also be tightly engaged with the inner periphery of the metal axle tube 2 by force-fitting, and the second holding member 22 and the supporting member 23 sandwiches the fixing member 24, which is a simple method for mounting these members.

Each of the first holding member 21 and the second holding member 22 has a hole 211, 221 through which a shaft 31 of the rotor 3 extends. Preferably, the shaft 31 has a minimum contact area with the first holding member 21 and the second holding member 22. As illustrated in FIG. 2, an inner flange 212 is formed on an inner periphery defining the hole 211 of the first holding member 21 and an inner flange 222 is formed on an inner periphery defining the hole 221 of the second holding member 22.

The supporting member 23 comprises a supporting portion 230 that may be a closed bottom side of the supporting member 23. Alternatively, as illustrated in FIGS. 1 and 2, the supporting member 23 has a hole 231 and a supporting plate 232 for covering the hole 231. A distal end of the shaft 31 of the rotor 3 rests on the supporting portion 230 or the supporting plate 232. The fixing member 24 may be a conventional retaining ring and is fixed in the metal axle tube 2 at an appropriate location. In addition, the fixing member 24 comprises a hole 241, a periphery defining the hole 241 being deformable to allow easy passage of the shaft 31 of the rotor 3.

Figure 3:
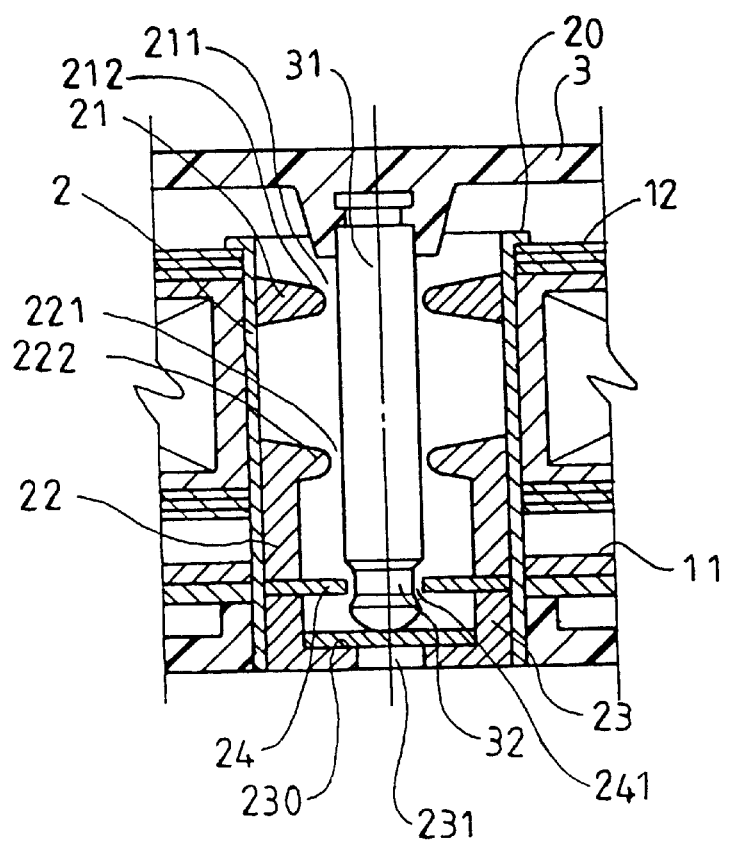
FIG. 3 is an enlarged view of an ellipse in FIG. 2.

The shaft 31 is mounted to a central portion of the rotor 3. The shaft 31 extends through the hole 211 of the first holding member 2, the hole 221 of the second holding member 22, and the hole 241 of the fixing member 24 with the distal end of the shaft 31 resting on the supporting portion 230 or the supporting plate 23 of the supporting member 23. In addition, the shaft 31 has a retaining groove 32 for securely receiving the periphery defining the hole 241 of the fixing member 24 to thereby prevent disengagement of the rotor 3. The shaft 31 and the inner flanges 212 and 222 of the first and second holding members 21 and 22 have a minimum gap or a slight contact therebetween, best shown in FIG. 3. A permanent magnet 33 is mounted to the rotor 3 for induction with the stator bobbin 12 and for attraction with the balancing sheet 11.

Figure 4:
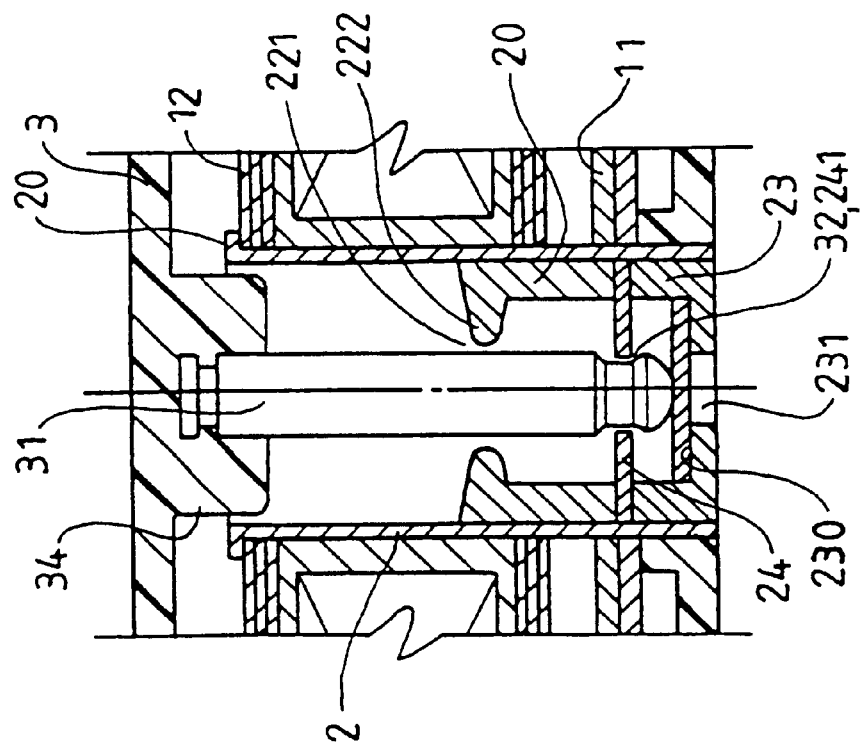
FIG. 4 is a sectional view similar to FIG. 3, illustrating a second embodiment of the supporting structure for rotor in accordance with the present invention.

FIG. 4 illustrates a second embodiment of the present invention, wherein the first holding member and the second holding member are integrally formed to form a single holding member 25 having a hole 251 through which the shaft 31 extends. Two inner flanges 252 are formed on an inner periphery defining the hole 251 and the shaft 31 have a minimum gap or a slight contact therebetween. In addition, the inner flanges 252 have an appropriate space therebetween. Preferably, the inner flanges 252 are respectively formed on two ends of the inner periphery defining the hole 251. Thus, the holding member 25 may have the smallest contact area with the shaft 31. In addition, a central axis of the shaft 31 has the smallest deviation from a central axis of the axle tube 20 when the shaft 31 is not turned. And rotation of the shaft 31 becomes stable immediately after it is turned.

Figure 5:
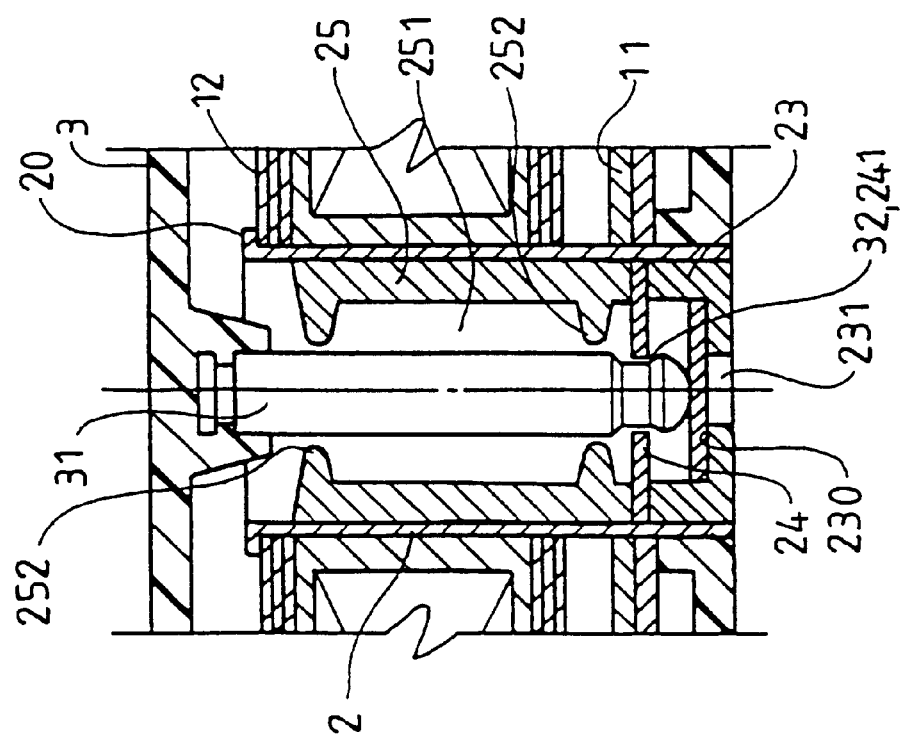
FIG. 5 is a sectional view similar to FIG. 3, illustrating a third embodiment of the supporting structure for a rotor in accordance with the present invention.

FIG. 5 illustrates a third embodiment of the present invention, wherein the only one holding member 22 is mounted in the metal axle tube 2. The holding member 22 has a hole 221 through which the shaft 31 extends. An inner flange 222 is formed on an inner periphery defining the hole 221. The inner flange 222 and the shaft 31 have a minimum gap or a slight contact therebetween. An end of the shaft 31 is mounted to a central downwardly depending hub 34 of the rotor 3. The hub 34 of the rotor 3 has a diameter slightly smaller than an inner diameter of the metal axle tube 2 such that the hub 34 of the rotor 3 also provides a holding function and cooperates with the holding member 22 to rotatably hold the shaft 31 such that the central axis of the shaft 31 has the smallest deviation from the central axis of the axle tube 20 when the shaft 31 is not turned.

Figure 6:
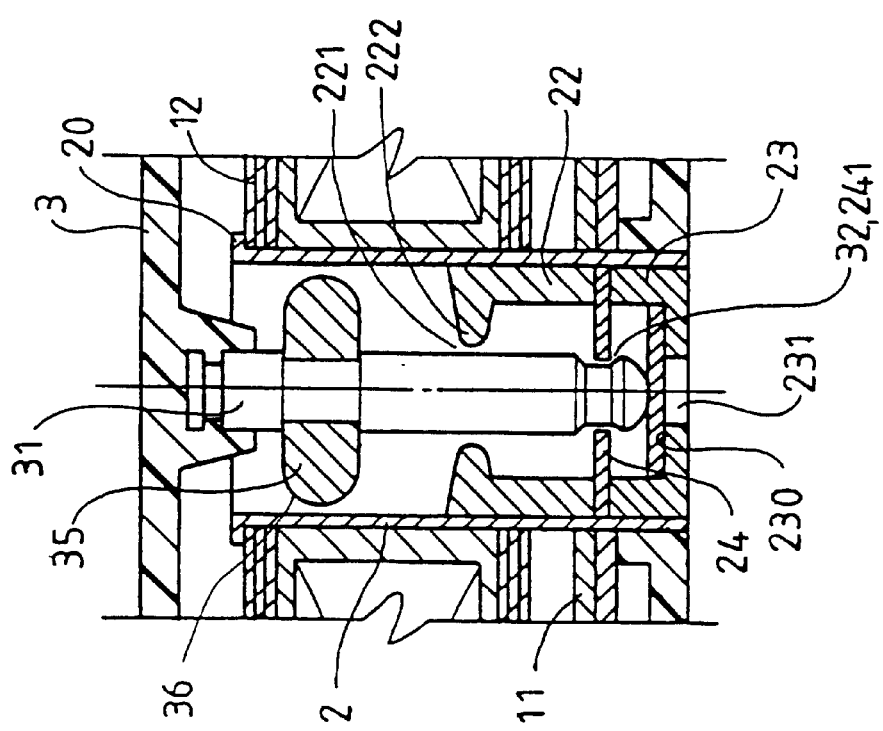
FIG. 6 is a sectional view similar to FIG. 3, illustrating a fourth embodiment of the supporting structure for a rotor in accordance with the present invention.

FIG. 6 illustrates a fourth embodiment of the present invention, wherein a first holding member 22 is mounted in the metal axle tube 2. The holding member 22 has a hole 221 through which the shaft 31 extends. An inner flange 222 is formed on an inner periphery defining the hole 221. The inner flange 222 and the shaft 31 have a minimum gap or a slight contact therebetween. An auxiliary holding member 35 made of rubber or plastic material is mounted around the shaft 31. As illustrated in FIG. 6, the shaft 31 may include an annular groove for securely receiving the auxiliary holding member 35. The auxiliary holding member 35 has a diameter slightly smaller than an inner diameter of the metal axle tube 2 such that the auxiliary holding member 35 and the inner periphery of the metal axle tube 2 have a minimum gap or a slight contact therebetween. Thus, the auxiliary holding member 35 also provides a holding function and cooperates with the holding member 22 to rotatably hold the shaft 31 such that the central axis of the shaft 31 has the smallest deviation from the central axis of the axle tube 20 when the shaft is not turned.

Figure 7:
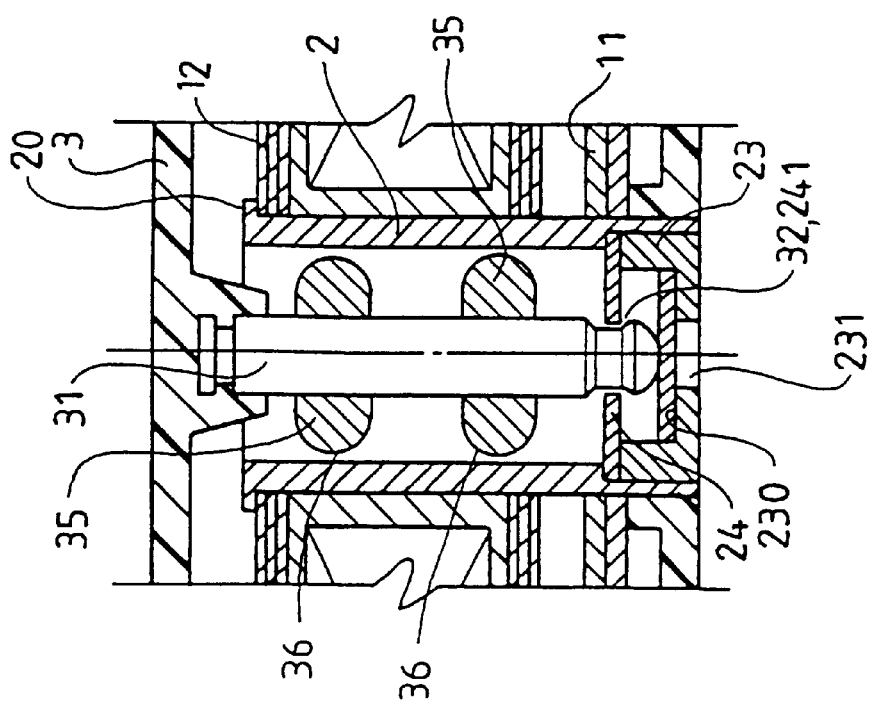
FIG. 7 is a sectional view similar to FIG. 3, illustrating a fifth embodiment of the supporting structure for a rotor in accordance with the present invention.

FIG. 7 illustrates a fifth embodiment of the invention, wherein two auxiliary holding members 35a and 35b made of rubber or plastic material are mounted around the shaft 31. The auxiliary holding members 35a and 35b are securely mounted around the shaft 31. Each auxiliary holding member 35a, 35b has a diameter slightly smaller than an inner diameter of the metal axle tube 2 such that the auxiliary holding members 35a and 35b and the inner periphery of the metal axle tube 2 have a minimum gap or a slight contact therebetween. Thus, the auxiliary holding members 35 together provide a holding function for rotatably holding the shaft 31 such that the central axis of the shaft 31 has the smallest deviation from the central axis of the axle tube 20 when the shaft 31 is not turned.

By means of provision of the supporting structure for a rotor in accordance with the present invention, the shaft 31 of the rotor 3 is merely supported by the supporting portion 230 or the supporting plate 232 of the supporting member 23 at the distal end thereof. In addition, the shaft 31 and the inner periphery of the metal axle tube 2 have a minimum gap or a slight contact therebetween by means of provision of the auxiliary holding member(s) 35 or the central bulge 34. Alternatively, the two holding members 21 and 22 and the shaft 31 have a minimum gap or a slight contact therebetween such that the central axis of the shaft 31 has the smallest deviation from the central axis of the axle tube 20 when the shaft 31 is not turned. And rotation of the shaft 31 becomes stable immediately after it is turned. Accordingly, the rotational friction and rotational noise of the shaft 31 can be reduced to the least condition. Furthermore, the rotor 3 can be processed and manufactured easily and the assembling procedure of the rotor 3 is simple, thereby reducing the manufacture cost.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A combination of a rotor and a supporting structure for the rotor, the combination comprising:

a metal axle tube;

two holding members mounted in the metal axle tube, each said holding member comprising a hole, an inner periphery defining the hole having an inner flange formed thereon;

a supporting member mounted in the metal axle tube and comprising a supporting portion; and a rotor having a shaft provided at a center thereof, the shaft extending through the holes of the holding members and comprising a distal end rotatably resting on the supporting portion of the supporting member, the shaft and the inner flanges of the holding members having one of a minimum gap and a slight contact therebetween, and further comprising a fixing member securely mounted in the metal axle tube, the fixing member having a hole defined by a periphery, the shaft comprising an engaging groove for securely receiving the hole-defining periphery of the fixing member.

2. The combination of a rotor and a supporting structure for the rotor, as claimed in claim 1, wherein the holding members, the supporting member, and the fixing member are tightly engaged with an inner periphery of the metal axle tube.

3. The combination of a rotor and a supporting structure for the rotor, as claimed in claim 2, wherein the holding members and the supporting member are tightly engaged with the inner periphery of the metal axle tube, the fixing member being sandwiched by the supporting member and one of the holding members.

4. The combination of a rotor and a supporting structure for the rotor, as claimed in claim 1, wherein the holding members are formed as a tubular member having the inner flanges, the integral holding member being tightly engaged with the inner periphery of the metal axle tube.

5. The combination of a rotor and a supporting structure for the rotor, as claimed in claim 4, wherein the holding members are integral with each other.

6. The combination of a rotor and a supporting structure for the rotor, as claimed in claim 1, wherein the holding members are integral with each other.

7. The combination of a rotor and a supporting structure for the rotor, as claimed in claim 1, wherein the metal axle tube is mounted on a base, a balancing sheet being mounted on the base and made of a magnetically conductive material, the rotor comprising a permanent magnet for mutual attraction with the balancing sheet.

8. A combination of a rotor and a supporting structure for the rotor, the combination comprising:

a metal axle tube;

a holding member mounted in the metal axle tube, the holding member comprising a hole, an inner periphery defining the hole having an inner flange formed thereon;

a supporting member mounted in the metal axle tube and comprising a supporting portion; and a rotor having a central hub, a shaft having an end securely attached to the central hub, the central hub forming an auxiliary holding member, the shaft extending through the hole of the holding member and comprising a distal end rotatably resting on the supporting portion of the supporting member, the auxiliary holding member and an inner periphery of the metal axle tube having one of a minimum gap and a slight contact therebetween, and further comprising a fixing member securely mounted in the metal axle tube, the fixing member having a hole defined by a periphery, the shaft comprising an engaging groove for securely receiving the hole-defining periphery of the fixing member.

9. The combination of a rotor and a supporting structure for the rotor, as claimed in claim 8, wherein the metal axle tube is mounted on a base, a balancing sheet being mounted on the base and made of a magnetically conductive material, the rotor comprising a permanent magnet for mutual attraction with the balancing sheet.

10. A combination of a rotor and a supporting structure for the rotor, the combination comprising:

a metal axle tube;

a first holding member mounted in the metal axle tube, the first holding member comprising a hole, an inner periphery defining the hole having an inner flange formed thereon;

a supporting member mounted in the metal axle tube and comprising a supporting portion; and a rotor having a shaft provided at a center thereof, an auxiliary holding member being mounted to the shaft, the shaft extending through the hole of the first holding member and comprising a distal end rotatably resting on the supporting portion of the supporting member, the auxiliary holding member of the shaft and an inner periphery of the metal axle tube having one of a minimum gap and a slight contact therebetween, and the shaft and the inner flange of the first holding member also having one of a minimum gap and a slight contact therebetween, and further comprising a fixing member securely mounted in the metal axle tube, the fixing member having a hole defined by a periphery, the shaft comprising an engaging groove for securely receiving the hole-defining periphery of the fixing member.

11. The combination of a rotor and a supporting structure for the rotor, as claimed in claim 10, wherein the auxiliary holding member is made of one of rubber and plastic material.

12. The combination of a rotor and a supporting structure for the rotor, as claimed in claim 10, wherein the shaft comprises an annular groove for mounting the auxiliary holding member.

13. The combination of a rotor and a supporting structure for the rotor, as claimed in claim 10, wherein the metal axle tube is mounted on a base, a balancing sheet being mounted on the base and made of a magnetically conductive material, the rotor comprising a permanent magnet for mutual attraction with the balancing sheet.

14. A combination of a rotor and a supporting structure for the rotor, the combination comprising:

a metal axle tube;

a supporting member mounted in the metal axle tube and comprising a supporting portion; and a rotor having a shaft provided at a center thereof, two auxiliary holding members being mounted to the shaft, the shaft comprising a distal end rotatably resting on the supporting portion of the supporting member, the auxiliary holding members of the shaft and an inner periphery of the metal axle tube having one of a minimum gap and a slight contact therebetween, and further comprising a fixing member securely mounted in the metal axle tube, the fixing member having a hole defined by a periphery, the shaft comprising an engaging groove for securely receiving the hole-defining periphery of the fixing member.

15. The combination of a rotor and a supporting structure for the rotor, as claimed in claim 14, wherein the auxiliary holding member is made of one of rubber and plastic material.

16. The combination of a rotor and a supporting structure for the rotor, as claimed in claim 14, wherein the shaft comprises two annular grooves for mounting the auxiliary holding members, respectively.

17. The combination of a rotor and a supporting structure for the rotor, as claimed in claim 14, wherein the metal axle tube is mounted on a base, a balancing sheet being mounted on the base and made of a magnetically conductive material, the rotor comprising a permanent magnet for mutual attraction with the balancing sheet.

* * * * *